United States Patent [19]

Onishi et al.

[11] Patent Number: 4,465,157
[45] Date of Patent: Aug. 14, 1984

[54] ENGINE MOUNTING DEVICE FOR MOTORCYCLE

[75] Inventors: Yoji Onishi, Kobe; Toshinori Oki, Hyogo, both of Japan

[73] Assignee: Kawasaki Jukogyo Kabushiki Kaisha, Kobe, Japan

[21] Appl. No.: 414,736

[22] Filed: Sep. 3, 1982

[30] Foreign Application Priority Data

Sep. 7, 1981 [JP] Japan .............................. 56-132921[U]

[51] Int. Cl.³ .............................................. B60K 5/12
[52] U.S. Cl. .................................... 180/228; 180/297; 267/141.3
[58] Field of Search ............... 180/228, 227, 219, 297; 248/573, 574, 561; 267/141.3, 141.4, 141.5

[56] References Cited

U.S. PATENT DOCUMENTS 3,542,146 11/1970 Hooper et al. ....................... 180/228
4,392,542 7/1983 Aiba ..................................... 180/228

Primary Examiner—John A. Pekar
Attorney, Agent, or Firm—Jordan and Hamburg

[57] ABSTRACT

An engine mounting device for a motorcycle including a plurality of support rods connected to a motorcycle body in a manner to extend crosswise therethrough, a plurality of bushes each fitted over one of the support rods and a plurality of cylindrical vibration absorbing rubber members each fitted over one of the bushes and fitted in one of mounting bores formed in an engine body. The engine mounting device further includes a plurality of spacers of a thickness smaller than the thickness of the vibration absorbing rubber members, each spacer being mounted between an outer peripheral surface of one of the bushes and an inner peripheral surface of one of the mounting bores at least in a portion in which the vibration absorbing rubber member is most compressed when the engine body is pulled rearwardly of the motorcycle body. The engine mounting device has particular utility with a motorcycle including a serrated belt or a chain mounted over a drive sprocket wheel mounted on one side of an engine and a follower sprocket wheel mounted on a shaft of a rear wheel.

5 Claims, 4 Drawing Figures

ENGINE MOUNTING DEVICE FOR MOTORCYCLE

BACKGROUND OF THE INVENTION

This invention relates to engine mounting devices for motorcycles, and more particularly it is concerned with an engine mounting device for a motorcycle having a serrated belt or a chain trained over a drive sprocket wheel supported on one side of an engine and a follower sprocket wheel supported on a rear wheel, the engine mounting device comprising support rods connected to an extending crosswise of a motorcycle body for supporting an engine body through cylindrical vibration absorbing rubber members and bushes.

When a motorcycle provided with this type of engine mounting device is suddenly started, the engine body is strongly pulled rearwardly of the motorcycle body by the tension of the serrated belt or chain to force a rear portion of each vibration absorbing rubber member to be radially compressed, so that the engine body might be biased rearwardly to reduce the distance between the drive sprocket wheel and the follower sprocket wheel. When this is the case, particularly when the serrated belt is in use, the serrated belt might be brought out of meshing engagement with the teeth of the sprocket wheels and the phenomenon of random meshing of the teeth might occur, thereby shortening the service life of the serrated belt. Even when a chain is used, loosening of the chain might occur. Also, the vibration absorbing rubber members might be liable to damage due to excessive compression.

Proposals have hitherto been made to obviate this problem by providing a vibration absorbing rubber member higher in hardness than the aforesaid fibration absorbing rubber members to the vicinity of the drive sprocket wheel to thereby regulate the amount of rearward movement of the engine body. However this solution has proved unsatisfactory because the difference in the hardness of the type of vibration absorbing rubber members has resulted in a reduction in the effects achieved in absorbing vibration. If the two vibration absorbing rubber members have the same hardness to avoid this reduction in the effects achieved in absorbing vibration, it becomes impossible to positively regulate the amount of rearward movement of the engine body.

SUMMARY OF THE INVENTION

This invention has been developed for the purpose of obviating the aforesaid disadvantages of the prior art. Accordingly the invention has as its object the provision of an engine mounting device for a motorcycle capable of preventing excessive compression of the vibration absorbing rubber member to limit the rearward movement of the engine body to an allowable range and at the same time absorbing ordinary engine vibration without any trouble by allowing the vibration absorbing rubber member to undergo deformation within the range of the aforesaid gap.

According to the invention, the aforesaid object is accomplished by mounting a spacer of a thickness smaller than the thickness of the vibration absorbing rubber member between the outer peripheral surface of the bush and the inner peripheal surface of the mounting bore in a portion in which at least the vibration absorbing rubber member is most compressed when the engine body moves rearwadly of the motorcycle body.

DETAILED DESCRIPTION OF THE PREFERRED EMBODIMENT

Figure 1:
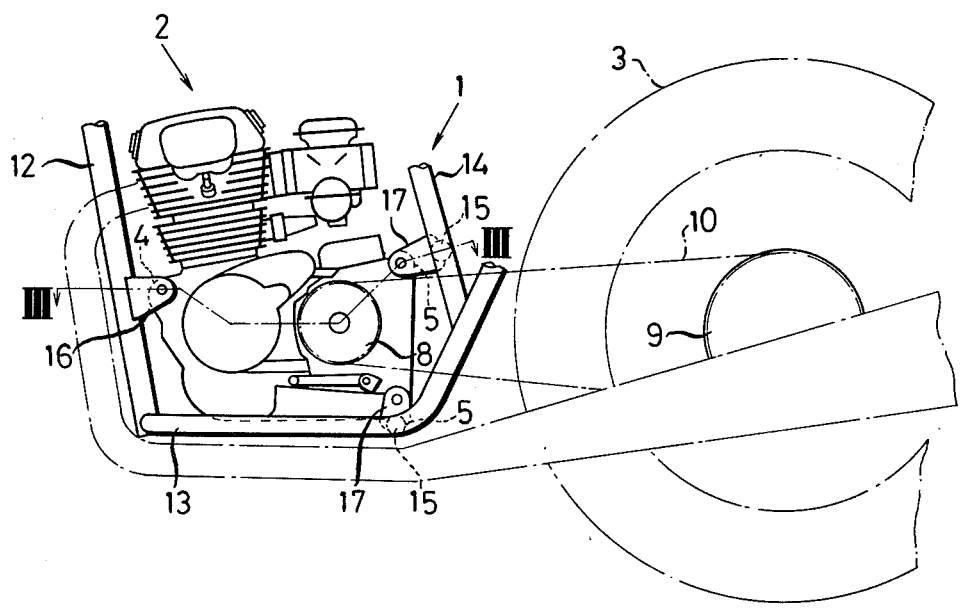
FIG. 1 is a side view of a motorcycle in which the invention can have application showing its essential portions.
Figure 2:
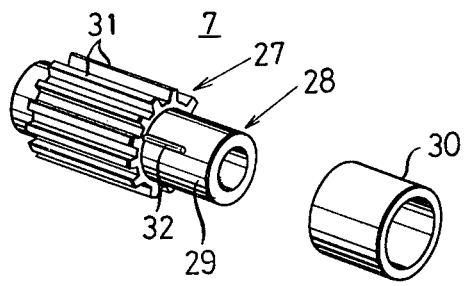
FIG. 2 is an exploded perspective view of the mounting member of the embodiment of the engine mounting device in conformity with the invention.
Figure 3:
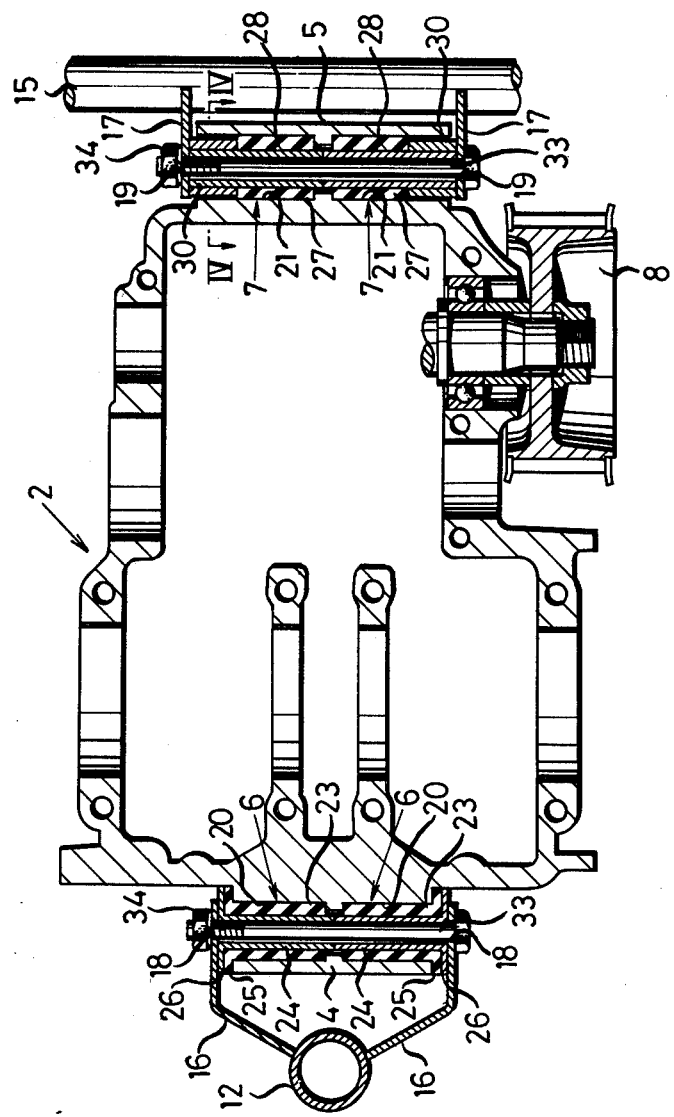
FIG. 3 is a sectional view taken along the line III—III in FIG. 1 showing the motorcycle shown in FIG. 1 having the engine mounting device according to the invention incorporated therein, with the internal mechanism of the engine being omitted.

Referring to FIGS. 1-4, a motorcycle comprises a motorcycle body 1, an engine body 2 and a rear wheel 3. The engine body 2 is supported by three support rods 33 connected to the motorcycle body 1. The support rod 33 in the front of the motorcycle or on the left side in FIG. 3 is connected to the motorcycle body 1 through two mounting members 6 each located on either side of the motorcycle at a front mounting portion 4 of the engine body 2; the support rod 33 in the upper rear of the motorcycle or on the right side in FIG. 3 is connected to the motorcycle body 1 through two mounting members 7 each located on either side of the motorcycle at an upper rear mounting portion 5 of the engine body 2; and the support rod in the lower rear of the motor cycle, not shown, is connected to the motorcycle body 1 through two mounting members 7 each located on either side of the motorcycle in a lower rear mounting portion 5 of the engine body 2. The engine body 2 supports a drive sprocket wheel 8 and the rear wheel 3 supports a follower sprocket wheel 9, and a serrated belt 10 is trained over the drive sprocket wheel 8 and follower sprocket wheel 9.

The motorcycle body 1 comprises a down tube 12, a rear lower pipe 13 in the form of a letter U with the legs of the letter U extending on both sides of the motorcycle, and a plurality of middle pipes 14 each connected to one of the two legs of the U-shaped rear lower pipe 13. Brackets 16 corresponding to the mounting portion 4 of the engine body 2 are attached to a lower portion of the down tube 12 in a manner to be located on opposite sides thereof; bracket 17 corresponding to the mounting portion 5 of the engine body 2 are attached to a connecting member 15 for connecting together the two legs of the U-shaped rear lower pipe 13 in a manner to be located on opposite sides thereof; and brackets 17 corresponding to the mounting portion 5 of the engine body 2 are attached to another connecting member 15 for connecting together the two middle pipes 14 in a manner to be located on opposite sides thereof. The bracket 16, 17 and 17 are formedwith mounting bores 18, 19 and 19 respectively. Meanwhile the engine body 2 is formed with mounting bores in positions corresponding to the mounting portions 4, 5 and 5 respectively, the mounting bores extending through the motorcycle body 1 across the width thereof. The first mounting bore located in the front of the engine body 2 includes mounting member bores 20 located on the left and right ends of the first mounting bore with a small minor diameter bore being interposed therebetween; the second mounting bore located in the upper rear of the engine body 2 includes mounting member bores 21 located on the left and right ends of the second mounting bore with a small minor diameter bore therebetween; and the third mounting bore located in the lower rear of the engine body 2 includes mounting member bores 21 located on the left and right ends of the third mounting bore with a small minor diameter bore therebetween.

The mounting members 6 in the front of the engine body 2 each comprise a cylindrical vibration absorbing rubber member 23 and a bush 24 over which the member 23 is fitted. The vibration absorbing rubber member 23 and the bush 24 are formed at one end thereof with flanges 25 and 26 respectively extending outwardly.

Meanwhile the mounting members 7 at the upper rear end and lower rear end of the engine body 2 each include a cylindrical vibration absorbing rubber member 27 shorter in length than the mounting member bore 21 formed in the engine body 2, and a bush 28 over which the rubber member 27 is fitted. The bush 28 partially extends outwardly of the rubber member 27 to form a projecting portion 29 over which an annular spacer 30 of a thickness smaller than the thickness of the rubber member 27 is fitted. The vibration absorbing rubber members 23 and 27 of the mounting members 6 and 7 are formed with axial ribs 31 on their outer circumferential surfaces and bonded to the bushes 24 and 28 by baking. The spacer 30 is formed of a hard material of high surface pressure strength, such as iron, aluminum, synthetic resinous material, etc., and the projecting portion 29 of the bush 28 has attached to its outer circumferential surface ribs 32 of a small thickness formed of rubber and extending axially to prevent disloding of the spacer 30 from its position on the projecting portion 29 of the bush 28.

The mounting members 6 and 7 are contained in mounting member bores 21 and 22 located at the front end and the upper and lower rear ends of the engine body 2. The bushes 24 and 28 of the mounting members 6 and 7 have their bores aligned with the mounting bores 18 and 19 of the brackets 16 and 17 of the motorcycle body 1 respectively, so as to insert the support rods 33 in the mounting bores 18 and 19 and the bores of the bushes 24 and 28 to connect the right and left sides of the engine body 2 and the vehicle body 1 together and nuts 34 are affixed to the support rods 33 to clamp same.

Figure 4:
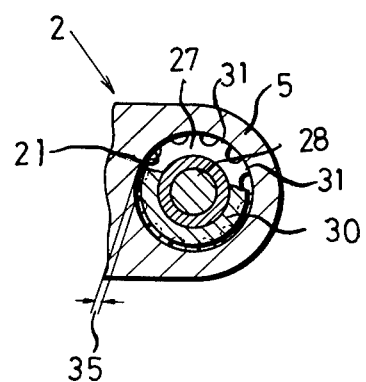
FIG. 4 is a fragmentary sectional view taken along the line IV—IV in FIG. 3.

In the embodiment shown and described hereinabove, a clearance 35 corresponding to the difference between the vibration absorbing rubber member 27 and the spacer 30 in thickness is formed between the outer circumferential surface of the spacer 30 and the inner wall surface of the mounting member bore 21 of the engine body 2 at the upper and lower mounting portions 5 of the engine body 2, as shown in FIG. 4.

In the aforesaid construction, ordinary vibration of the engine is absorbed by deformation of the vibration absorbing rubber members 23 and 27 and prevented from being transmitted to the motorcycle body 1. When the motorcycle is suddenly started, high tension acts on the serrated belt 10 and the engine body 2 is strongly pulled rearwardly. When this is the case, the engine body 2 strikes the spacers 30 to prevent excessive compression of the vibration absorbing rubber members 23 and 27 and rearward movement of the engine body 2. This is conducive to prevention of loosening of the serrated belt 10 or random meshing thereof with the sprocket wheels 8 and 9.

In the embodiment shown and described hereinabove, the spacing 35 is formed between the spacer 30 and the engine body 2. However the invention is not limited to this arrangement and a spacing may be defined between the bush 28 and the spacer 30 by securing the spacer 30 to the engine body 2. It is not essential that the spacer 30 extends the entire circumferential extent of the bush 28, and the spacer 30 may be mounted only on the side of the bush 28 on which the vibration absorbing rubber member 27 is compressed when the engine body 2 is pulled rearwardly. Alternatively the spacer 30 may be formed integrally with the engine body 2 or bush 28. In this embodiment, the spacers 30 are four in number and two spacers 30 each are mounted on the right and left sides of upper and rear mounting portions 5 of the engine body 2. However the invention is not limited to this mounting of the spacers 30 and the spacers 30 may be mounted in any other suitable positions bytaking the mounting position, the number of pacers and other mounting conditions into consideration. The spacers 30 may, of course, be in any other number than four. The serrated belt 10 has been described as being used for driving the rear wheel 3. However, the serrated belt 10 may be replaced by an ordinary link chain.

From the foregoing description, it will be appreciated that according to the invention the vibration absorbing rubber members are allowed to undergo deformation within the limits of the clearance between the spacer and the bush or between the spacer and the engine body. Thus the engine mounting device according to the invention can achieve the effects of not only absorbing ordinary vibration of the engine by the deformatin of the vibration absorbing rubber member by utilizing its vibration absorbing characteristics to avoid transmission of the vibration of the motorcycle body but also preventing loosening of the serrated belt and random meshing thereof with the sprocket wheels, which might otherwise occur when the engine body of the motorcycle is strongly pulled rearwardly by the tension of the serrated belt when it is suddenly started, by virtue of the arrangement whereby the spacer strikes the engine body or the bush to thereby limit the rearward movement of the engine body to the range of the aforesaid clearance. The advantages offered by the invention includes a prolonged service life of the serrated belt, prevention of damage to the vibration absorbing rubber member because of its excessive compression being prevented by the spacer, and prevention of loosening of a link chain or dislodging thereof when the link chain is used in place of the serrated belt.

What is claimed is:

1. In a motorcycle comprising a motorcycle body, an engine connected to the motorcycle body and having mounting bores, front and rear wheels rotationally connected to the body, a drive sprocket wheel mounted on one side of the engine, a follower sprocket wheel mounted on the rear wheel, a serrated belt or chain trained over the drive sprocket wheel and the follower sprocket wheel, and an engine mounting device including a plurality of support rods connected to and extending crosswise of the motorcycle body, a plurality of bushes fitted over said support rods, and a plurality of cylindrical vibration absorbing rubber members situated over said bushes inside the mounting bores formed in the engine, wherein the improvement of the engine mounting device comprises spacers of a thickness smaller than the thickness of said vibration absorbing rubber members, each said spacer being formed of a hard material of high surface pressure strength, each said spacer being mounted outside of said vibration absorbing rubbers and located between an outer end of each said bush and inside of each said mounting bore at least in a portion in which the vibration absorbing rubber member is most compressed when the engine body is strongly pulled rearwardly of the motorcycle body.

2. An engine mounting device as claimed in claim 1, wherein said spacers are each annular in shape and fitted over one of said bushes.

3. An engine mounting device as claimed in claim 1, wherein said spacers are each annular in shape and fitted in one of said mounting bores formed in the engine body.

4. An engine mounting device for supporting a motorcycle engine with mounting bores on a motorcycle body with flanges comprising a plurality of support rods extending through the mounting bores of the motorcycle engine and the flanges of the motorcycle body for supporting the engine on the body, a plurality of bushes closely fitted over the support rods, each bush including projecting portions at longitudinal ends thereof, a plurality of vibration absorbing rubber memberssituated over the bushes, each rubber member having a plurality of ribs on an outer surface extending along the longitudinal direction thereof so that spaces are formed between the adjacent ribs, outer surfaces of the ribs being closely situated inside the mounting bore of the engine to support the engine, and a plurality of spacers, each having a thickness smaller than the thickness of the vibration absorbing rubber member and being formed of a hard material of high surface pressure strength, each spacer being mounted on the projecting portions of the bush adjacent to the vibration absorbing rubber member so that when the motorcycle engine is strongly pulled rearwardly, the spacers as well as the vibration absorbing rubber members absorb the tension thereof.

5. An engine mounting device according to claim 4, in which said bush further includes second ribs formed on each projecting portion thereof for immovably supporting the spacer thereon.

* * * * *